US011714258B2

(12) United States Patent
Rajan et al.

(10) Patent No.: US 11,714,258 B2
(45) Date of Patent: Aug. 1, 2023

(54) CONGRUENTLY MELTING HIGH PURITY TITANIUM ALLOY FOR OPTICAL MOUNTS, FLEXURES, AND STRUCTURAL ELEMENTS REQUIRING COMPLIANCE

(71) Applicant: RAYTHEON COMPANY, Waltham, MA (US)

(72) Inventors: Sunder S. Rajan, Anaheim, CA (US); Nicholas J. LoVullo, El Segundo, CA (US); Keith Carrigan, Marina Del Rey, CA (US); Mary K. Herndon, Littleton, MA (US)

(73) Assignee: RAYTHEON COMPANY, Waltham, MA (US)

( * ) Notice: Subject to any disclaimer, the term of this patent is extended or adjusted under 35 U.S.C. 154(b) by 242 days.

(21) Appl. No.: 16/942,859

(22) Filed: Jul. 30, 2020

(65) Prior Publication Data

US 2022/0035123 A1    Feb. 3, 2022

(51) Int. Cl.
G02B 7/18    (2021.01)
C22C 14/00   (2006.01)
G02B 7/182   (2021.01)

(52) U.S. Cl.
CPC .............. *G02B 7/182* (2013.01); *C22C 14/00* (2013.01)

(58) Field of Classification Search
CPC .......... C22C 14/00; G02B 7/182; C22F 1/183
See application file for complete search history.

(56) References Cited

U.S. PATENT DOCUMENTS

| | | | |
|---|---|---|---|
| 5,674,280 A | 10/1997 | Davidson et al. | |
| 5,801,891 A | 9/1998 | Lloyd | |
| 2013/0180627 A1 | 7/2013 | Miura et al. | |
| 2014/0061420 A1 | 3/2014 | Kaufman et al. | |
| 2017/0275742 A1 | 9/2017 | Ganor | |
| 2018/0004070 A1 | 1/2018 | Po et al. | |
| 2019/0105876 A1 | 4/2019 | Al-Aqeeli et al. | |
| 2019/0111482 A1 | 4/2019 | Djemai et al. | |
| 2020/0248285 A1 | 8/2020 | Rajan et al. | |

FOREIGN PATENT DOCUMENTS

| | | |
|---|---|---|
| CN | 109136600 A | 1/2019 |
| EP | 0601804 A1 | 6/1994 |
| EP | 1890183 A1 | 2/2008 |
| EP | 3112055 A1 | 1/2017 |
| EP | 3252278 A1 | 12/2017 |
| FR | 3047489 A1 | 8/2017 |
| WO | 2011139384 A1 | 11/2011 |
| WO | 2013112217 A2 | 8/2013 |
| WO | 2015038233 A1 | 3/2015 |
| WO | 2017137671 A1 | 8/2017 |
| WO | 2018126191 A1 | 7/2018 |
| WO | 2020160117 A1 | 8/2020 |

OTHER PUBLICATIONS

Notification of Transmittal of the International Search Report and the Written Opinion of the International Searching Authority, or the Declaration dated Jun. 23, 2021, 20 pages.
Notification of Transmittal of the International Search Report and the Written Opinion of the International Searching Authority, or the Declaration dated Jul. 6, 2021, 16 pages.
ASTM International, F1713-08, "Standard Specification for Wrought Titanium-13Niobium-13Zirconium Alloy for Surgical Implant Applications (UNS R58130)1", Reapproved 2013, 5 pps.
Bhuiyan et al., "Boron nitride nanotube reinforced titanium metal matrix composites with excellent high-temperature performance" Cambridge Core, vol. 32, Issue 19, 2017, pp. 3744-3752 (Abstract Only).
Bhuiyan et al., "Interfacial reactions between titanium and boron nitride nanotubes", ScienceDirect, Scripta Materialia, vol. 127, Jan. 15, 2017, pp. 108-112 (Abstract Only).
Bobbio et al., "Additive manufacturing of a functionally graded material from Ti—6Al—4V to Invar: Experimental characterization and thermodynamic calculations", Acta Materialia 127 (2017) 133-142.
Chen et al., "Additive manufacturing of metal functionally graded materials: A Review", Proceedings of the 29th Annual Solid Freedom Fabrication Symposium 2018.
Chen et al., "Optimization of lightweight structure and supporting bipod flexure for a space mirror", Applied Optics, vol. 55, No. 36, Dec. 20, 2016.
Chen et al., "Processing and properties of magnesium containing a dense uniform dispersion of nanoparticles" Nature 528, 539-543 (2015) (Abstract Only).
Chin, "Optical Mirror-Mount Design and Philosophy", Applied Optics, Jul. 1964, vol. 3, No. 7, pp. 895-901.
Chow et al.,"Evaluation of Cardiovascular Stents as Antennas for Implantable Wireless Applications", IEEE Transactions on Microwave Theory and Techniques, Plenum, USA, vol. 57, No. 10, Oct. 1, 2009, pp. 2523-2532, XP011276668.
Chu et al., "Design of Bipod flexures for space mirror", Proceedings of SPIE, vol. 8196, 819620-1 through 819620-11.
Ezekiel G. Merriam, "Design of 3D-Printed Titanium Compliant Mechanisms," Proceedings of the 42nd Aerospace Mechanisms Symposium, NASA Goddard Space Flight Center, May 14-16, 2014, 6 pps.
Gen-El-Mec Associates, Inc., "Gen-El-Mec Specializes in Precision & Custom CNC Milling, Turning & Wire EDM Services", Custom Manufacturing & Inspection of Titanium Flexures—Connecticut, © 2014, 2 pages.
Harrison et a., "Polyethylene/boron nitride composites for space radiation shielding", Journal of Applied Polymer Science, 2008, vol. 109 Issue 4 (Abstract Only).

(Continued)

*Primary Examiner* — Jessee R Roe
(74) *Attorney, Agent, or Firm* — Cantor Colburn LLP

(57) ABSTRACT

A flexure including a bipod strut pair extending from a base and a titanium-zirconium-niobium alloy, which includes titanium, about 13.5 to about 14.5 wt. % zirconium, and about 18 to about 19 weight % (wt. %) niobium. The titanium-zirconium-niobium alloy has a congruent melting temperature of about 1750 to about 1800° Celsius (° C.).

12 Claims, 9 Drawing Sheets

(56) References Cited

OTHER PUBLICATIONS

Hiroaki Matsumoto, et al., "Beta TiNbSn Alloys with Low Young's Modulus and High Strength", Materials Transactions, vol. 46, No. 5 (2005) pp. 1070 to 1078.
ISR/WO, Issued Apr. 14, 2020, RAY0410PCT.
Jason J. Gorman, et al., "MEMS Nanopositioning Mechanisms: Design and Experimental Characterization", MEMS Alliance Symposium, Apr. 19, 2005, 16 pps.
Kihm et al., "Adjustable bipod flexures for mounting mirrors in a space telescope", Applied Optics vol. 51, No. 32, Nov. 10, 2012.
Michael Gasik, et al., "Phase equilibria and thermal behaviour of biomedical Ti—Nb—Zr alloy", ResearchGate, 17th Plansee Seminar Jan. 2009, vol. 1 8 pps.
MIT OpenCourseWare (Massachusetts Institute of Technology), http://ocw.mit.edu/terms, 2.72 Elements of Mechanical Design Lecture 08: Flexures, Spring 2009, 42 pps.
Qing Liu, "α' Type Ti—Nb—Zr alloys with ultra-low Young's modulus and high strength", Progress in Natural Science Materials International 2013; 23 (6) pp. 562-565.
Qingkun Meng, et al., "A β-type TiNbZr alloy with low modulus and high strength for biomedicalapplications", Progress in Natural Science:Materials International 24 (2014), pp. 157-162.
Reichardt, "Additive Manufacturing of Metal-based Functionally Graded Materials", UC Berkeley, PhD Thesis Nuclear Engineering 2017; pp. 1-108.
Robert Fata, et al., "Flexure mounts for high performance astronomical lenses", Proc. of SPIE vol. 6269, 62695T, (2006), 12 pps.
Schneider et al., "Study of the non-linear stress-strain behavior in Ti—Nb—Zr alloys", Materials Research, vol. 8, No. 4, pp. 435-438, XP009152292, Oct. 1, 2005.
Thibeault et al., "Radiation Shielding Materials Containing Hydrogen, Boron, and Nitrogen: Systematic Computational and Experimental Study—Phase I" NIAC Final Report, 2012.
Tian Tuo Machinery, "The first successful 3D printing of BNNT", https://frptitan.com/bnnt-titanium-composites/.
Todd M. Mower, et al., "Mechanical behavior of additive manufactured, powder-bed laser-fused materials", Materials Science & Engineering A 651 (2016) pp. 198-213.
Tomomichi Ozaki, et al., "Beta Ti Alloys with Low Young's Modulus", Materials Transactions, vol. 45, No. 8 (2004) pps. 2776 to 2779.
Vukobratovich D, et al., "Flexure Mounts For High Resolution Optical Elements", Proc. of SPIE vol. 0959, Optomechanical and Electro-Optical Design of Industrial Systems, ed. R J Bieringer, K G Harding (Jan. 1988) Copyright SPIE., 19 pps.
Wang et al., "Selective laser melting under the reactive atmosphere: A convenient and efficient approach to Fabricate ultrahigh strength commerically pure titanium without sacrificing ductility", ScienceDirect, Materials Science and Engineering: A, vol. 762, Aug. 5, 2019, 138078 (Abstract Only).
Yan et al., "Additive manufacturing of functionally graded metallic materials using laser metal deposition", Elsevier, Additive Manufacturing 31 (2020) 100901.
Reichardt, "Additive Manufacturing of Metal-based Functionally Graded Materials", UC Berkeley, PhD Thesis Nuclear Engineering 2017; pp. 109-163.
Reichardt, "Additive Manufacturing of Metal-based Functionally Graded Materials", UC Berkeley, PhD Thesis Nuclear Engineering 2017; pp. 164-212.
Reichardt, "Additive Manufacturing of Metal-based Functionally Graded Materials", UC Berkeley, PhD Thesis Nuclear Engineering 2017; p. 213.
Rao et al. "Replication and bioactivation of Ti-based alloy scaffold macroscopically identical to cancellous bone from polymeric template with TiNbZr powders." Journal of the Mechanical Behavior of Biomedical Materials 88 (2018): 296-304.
A Zettl, "Electroactive, Radiation-shielding Boron Nitride Polymer Composites", University of California at Berkeley, AFOSR Low Density Materials Program Review, Dayton, Ohio Jun. 4, 2012, (https://community.apan.org/wg/afosr/rn/low_density_materials/113496/download), 16 pages.
PCT Notification of Transmittal of the International Preliminary Reporton Patentability of the International Application No. PCT/US2021/026373 dated Feb. 9, 2023, 14 pages.
PCT Notification of Transmittal of the International Preliminary Reporton Patentability of the International Application No. PCT/US2021/026376 dated Feb. 9, 2023, 11 pages.

CONGRUENTLY MELTING HIGH PURITY TITANIUM ALLOY FOR OPTICAL MOUNTS, FLEXURES, AND STRUCTURAL ELEMENTS REQUIRING COMPLIANCE

BACKGROUND

The present disclosure relates to metallic alloys, and more specifically, to titanium alloys for optical mounts, flexures, and structural elements requiring compliance.

Due to their favorable properties, titanium (Ti) alloys are used in a variety of aerospace applications. For example, such materials are used in structural airframes and engine components. Titanium alloys are also used in high resolution optical instruments in space exploration, precise motion control mechanical systems, flexural parts of micro-positioners and optical mounts, and wire-type antennae, all of which are often designed to maintain the position of an optical element throughout its assigned lifetime.

Generally, flexures mentioned in the foregoing applications are elastic elements that provide precisely controlled motion under static and dynamic mechanical loads and thermal stress effects, including transient and steady state temperature regimes. Flexures are passive mechanical structures that isolate a light transmitting or reflecting glass or crystal optical unit from the mechanical and thermal effects of the adjoining metal structural support.

Flexures generally must satisfy various criteria. For example, flexures should exert low stress on the optic or optoelectronic components and have enough stiffness to maintain the alignment of optics. Flexures should also maintain the specified tolerance during operation, as well as under variable temperatures. Further, flexures should maintain the position of optical element throughout its assigned lifetime, and all dimensional and mass parameters should be minimized.

SUMMARY

According to one or more embodiments of the present disclosure, a flexure includes a bipod strut pair extending from a base and a titanium-zirconium-niobium alloy, which includes titanium, about 13.5 to about 14.5 wt. % zirconium, and about 18 to about 19 weight % (wt. %) niobium. The titanium-zirconium-niobium alloy has a congruent melting temperature of about 1750 to about 1800° Celsius (° C.).

According to other embodiments of the present disclosure, a flexure includes a circular body and a plurality of attachment arms arranged on the circular body to couple the flexure to an optical element. The flexure includes a titanium-zirconium-niobium alloy with titanium, about 13.5 to about 14.5 wt. % zirconium, and about 18 to about 19 weight % (wt. %) niobium. The titanium-zirconium-niobium alloy has a congruent melting temperature of about 1750 to about 1800° C.

Yet, according to other embodiments of the present disclosure, a method of making a compliant mount or mechanism structure includes forming a congruently melting alloy of titanium, about 13.5 to about 14.5 wt. % zirconium, and about 18 to about 19 wt. % niobium. A congruently melting temperature of the congruently melting alloy of titanium being about 1750 to about 1800° C. The method further includes forging the congruently melting alloy to a predetermined shape.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
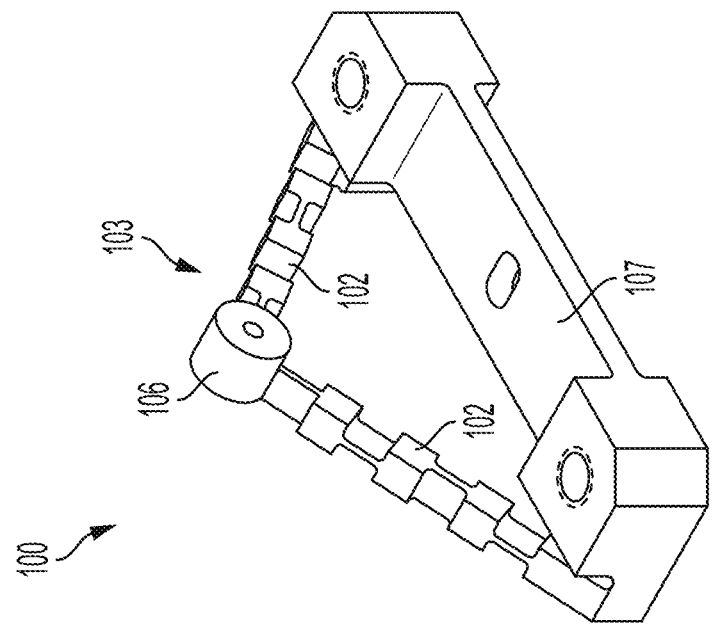
FIG. 1A depicts a perspective view of a flexure made from a titanium-zirconium-niobium alloy according to embodiments of the present disclosure.

For the sake of brevity, conventional techniques related to metallurgical processing, melting, and casting may or may not be described in detail herein. Moreover, the various tasks and process steps described herein can be incorporated into a more comprehensive procedure or process having additional steps or functionality not described in detail herein. Various steps in the manufacture of metal alloys are known and so, in the interest of brevity, many conventional steps will only be mentioned briefly herein or will be omitted entirely without providing the known process details.

Titanium alloys play key roles in space and tactical design applications due to their favorable properties, such as high strength and ductility, in combination with reduced elastic modulus. However, challenges of using titanium alloys in flexures, optical mounts, and other compliant structures and mechanisms are due to their lack of sufficient flexibility and excessive actuation effort needed due to energy storage in the deflection mechanism. In some cases, fabrication of advanced compliant mounts and mechanisms with titanium alloys is limited by conventional post-processing, which includes rolling, extrusion, and other processes associated with large plastic deformations, due to such processes potentially affecting the material micro-structure.

Using titanium alloys in compliant mounts or mechanism structures such as flexures is also challenging because database information on the phase equilibria and thermochemistry of desired ternary titanium alloys, e.g., titanium-zirconium-niobium (Ti—Zr—Nb), is lacking. Such information is needed to model the alloy in various flexures, as well as its metallurgical processing, particularly, its solidification homogenization, transient phase, and congruent melting specifics. The data is also needed to predict intermetallic phase formation and stability during industrial processing for the particular flexure. Accordingly, accurate experimental and thermodynamic assessment of various titanium alloys is needed to determine which ones are best suited for flexure applications.

Accordingly, one or more embodiments of the disclosure address the above-described shortcomings by using a titanium-zirconium-niobium (Ti—Zr—Nb) alloy, in particular a titanium alloy that includes about 13.5 to about 14.5 wt. % zirconium, about 18 to about 19 weight % (wt. %) niobium, and optionally other elements, to form compliant forged structural elements, such as optical mounts, flexures, and antenna applications. When scaled up and used to form forged compliant structures, the titanium-zirconium-niobium alloys demonstrate a combination of high strength, low modulus (e.g., 40% less than other titanium alloys), and excellent ductility, which balances the structural requirements of flexible compliant structural elements.

The above-described aspects of the disclosure provide various advantages. The resulting structural elements can absorb the support load, while simultaneously minimizing or eliminating the bending moment and local mounting pressure that might distort the optical surface that the structure is supporting. At the same time, the super elasticity and low modulus allow the compliant structure to return to a predetermined shape and position after being subjected to shock, vibration, and/or acceleration, which is essential when used in a moving application, such as a flexure in a space application. Further, because of the low modulus and compliance, discrete sections of the material in the forged product can be modified to achieve the desired overall stiffness and strength.

Alloy Materials

The titanium-zirconium-niobium alloys used to form compliant structures include about 13.5 to about 14.5 wt. % zirconium, about 18 to about 19 weight % (wt. %) niobium, and optionally other elements, with the balance being titanium. According to some embodiments of the present disclosure, the titanium-zirconium-niobium alloy includes 60 to about 72 wt. % titanium. According to other embodiments of the present disclosure, the titanium-zirconium-niobium alloy includes 66.5 to about 68.5 wt. % titanium. Yet, according to other embodiments of the present disclosure, the titanium-zirconium-niobium alloy includes about or any range between about 60, 61, 62, 63, 64, 65, 66, 67, 68, 69, 70, 71, and 72 wt. % titanium.

According to one or more embodiments of the present disclosure, other elements are included in the titanium-zirconium-niobium alloy, which can be but are not limited to, iron (Fe), oxygen (O), carbon (C), nitrogen (N), hydrogen (H), or any combination thereof. However, the titanium-zirconium-niobium alloys can include other elements not mentioned in the foregoing elements, and the disclosure is not to be construed as being limited to these elements. The amounts of the other elements in the titanium-zirconium-niobium alloy are significantly less than the zirconium and niobium present, with the titanium making up a majority of the alloy. According to some embodiments of the present disclosure, the amount of each of the other elements is less than 1 wt. %, less than 0.5 wt. %, less than 0.2 wt. %, less than 0.1 wt. %, less than 0.05 wt. %, less than 0.02 wt. %, or less than 0.01 wt. %. Yet, the amounts of each of the other elements can vary substantially depending on the melting practices employed and the product being formed.

To form the titanium-zirconium-niobium alloy, various methods of melting, casting, and metal working can be used. The alloy can be manufactured by combining, melting and casting the titanium, zirconium, niobium, and optionally other elements, using a variety of melting and metal working practices, including but not limited to, vacuum induction melting, vacuum arc re-melting, hot forging, isothermal forging, rolling into billet shapes or slabs and, eventually, forming bar or sheet/plate products. The material can also be drawn into wire products for applications including, but not limited to, antenna wire, actuators, etc.

The methods used to form the alloys can alter the final chemical composition of the alloys. Methods of melting, e.g., air melting and vacuum induction melting, and using alloy powders made from atomization using air or oxidizing media can increase the oxygen level to as much as 0.3%, for example.

Prior to designing a metallurgical cycle, the phase diagram must be evaluated for an alloy, including the congruent melting zone. With a limited experimental data on properties of different constituents and phases, a spline approximation can be used, and three-dimensional (3D) printing can define all metallurgical states using low-temperature polymers for modeling. The congruent melting is defined by a selected and separate color, such that the most applicable metallurgical process for congruent melting can be selected from that plastic model; it can have different approximations provided that all end within the congruent zone to reflect a single-phase formation. Dimensional parameters of the congruent zone can be limited in sizes so that the incremental variations in practically achieved formulations still lie within the congruent zone defined by the phase diagram.

The titanium-zirconium-niobium alloys are associated with beta micro-structural formation, excluding omega phase formation and the related intermetallic inclusions. Furthermore, the formation of any grain boundary precipitate within the beta phase is eliminated by virtue of the structural homogeneity of the phases and formation of solid solutions during all post-processes associated with high temperatures and even quenching. Typically, congruent melting is further characterized by the absence of a "beta transus," uniformity of composition and the resultant uniform microstructure. In the case of ternary and tetranary alloys, congruent melting can be achieved by the eutectic melting between two binary phases. Congruent melting zone determinations include construction of the ternary phase diagram by examination of the binary systems involved, i.e., a systematic study of Ti—Zr, Ti—Nb, and Nb—Zr systems. 3D printing technology is very helpful in the synthesis of the ternary system.

According to one or more embodiments of the present disclosure, the congruent melting temperature of the titanium-zirconium-niobium alloy is about 1950 to about 2000° C. According to other embodiments, the congruent melting temperature of the titanium-zirconium-niobium alloy is about 1850 to about 2000° C. Yet, according to other embodiments, the congruent melting temperature of the titanium-zirconium-niobium alloy is about or in any range between about 1850, 1860, 1870, 1890, 1900, 1910, 1920, 1930, 1940, 1950, 1960, 1970, 1980, 1990, and 2000° C. The congruent melting temperature is less than each of titanium, zirconium, and niobium.

Compliant Structures

The titanium-zirconium-niobium alloys are used to form compliant mount or mechanism structures, such as a flexure (e.g., optical mounting flexure) or an antenna (e.g., a wire antenna).

The phrase "compliant" when referring to a mount or mechanism structure refers to a flexure or antenna, such as an optical mounting flexure or a wire antenna. The phrase "flexure" and variations thereof refer to a flexible element (or combination of elements) engineered to be compliant in specific degrees of freedom. Non-limiting examples of flexures include opto-mechanical mounts, opto-electronic mounts, and other compliant structures of mechanisms. Flexures are all characterized by nonlinear stress-displacement response.

Various methods of melting, casting, and metal working can be used to form the titanium-zirconium-niobium alloy into compliant mount or mechanism structures. The alloy can be manufactured by combining, melting and casting the titanium, zirconium, niobium, and optionally other elements, using a variety of melting and metal working practices, including but not limited to, vacuum induction melting, vacuum arc re-melting, hot forging, isothermal forging, rolling into billet shapes or slabs and, eventually, forming bar or sheet/plate products. The material can also be drawn into wire products for applications including, but not limited to, antenna wire, actuators, etc. The resulting alloy materials have excellent forgeability, which enables fabrication of complex compliant configurations.

Figure 1B:
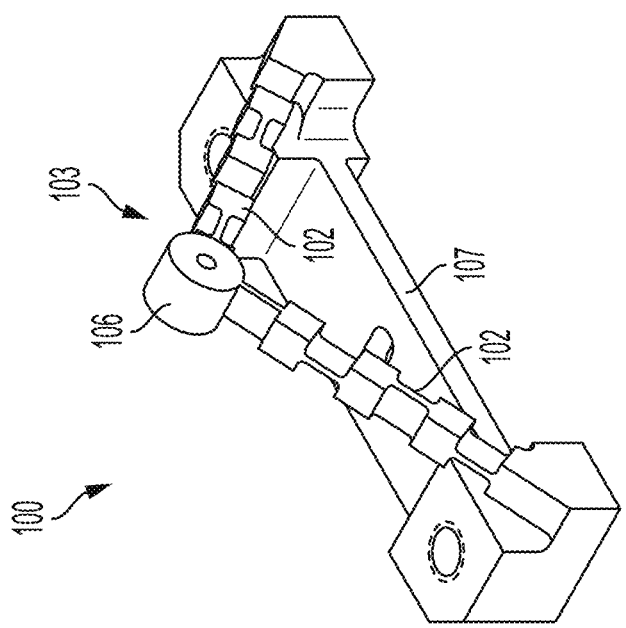
FIG. 1B depicts another perspective view of a flexure made from a titanium-zirconium-niobium alloy according to embodiments of the present disclosure.

FIGS. 1A and 1B depict perspective views of a flexure 100 made from a titanium-zirconium-niobium alloy according to embodiments of the present disclosure. The flexure 100 is a monolithic structure and part of a mounting assembly that is used to support an opto-mechanical or opto-electronic surface. In one or more embodiments, the bipod flexure 100 is part of a precision mirror mount.

Each bipod flexure 100 includes a bipod strut pair 103 with struts (individual first strut and second strut) converging at a socket 106. The strut pair 103 extends form a support base 107, which is arranged at oblique angles with respect to the individual first and second struts of the strut pair 103.

Figure 1C:
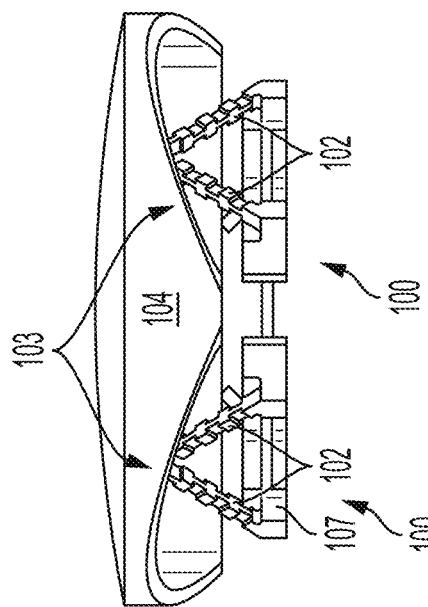
FIG. 1C depicts a perspective view of a plurality of flexures made from a titanium-zirconium-niobium alloy coupled to a support base according to embodiments of the present disclosure.
Figure 1E:
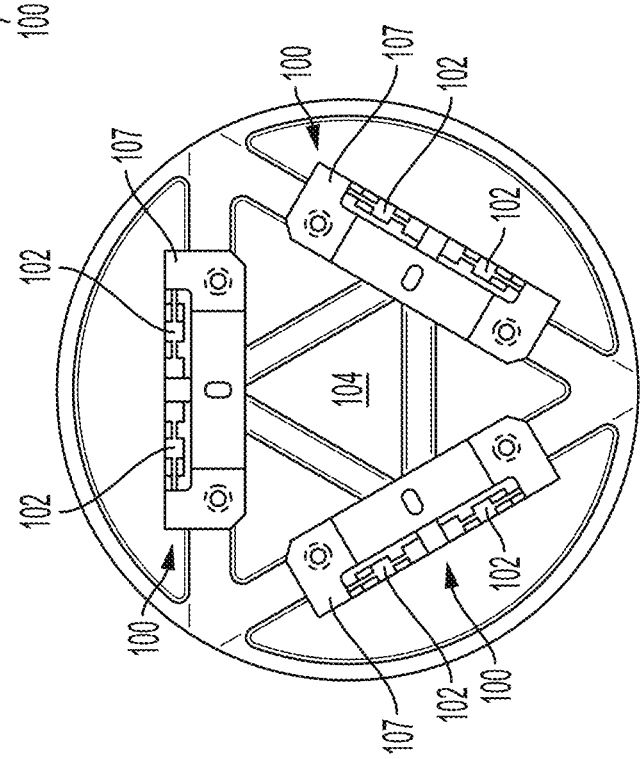
FIG. 1E depicts a top view of a plurality of flexures made from a titanium-zirconium-niobium alloy coupled to a support base according to embodiments of the present disclosure.
Figure 1D:
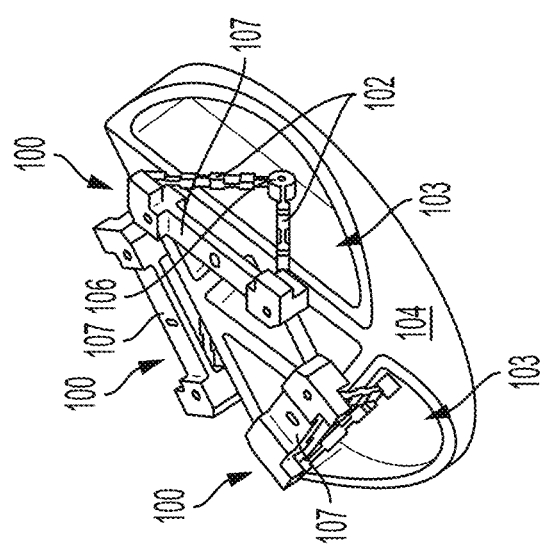
FIG. 1D depicts a side view of a plurality of flexures made from a titanium-zirconium-niobium alloy coupled to a support base according to embodiments of the present disclosure.
Figure 2:
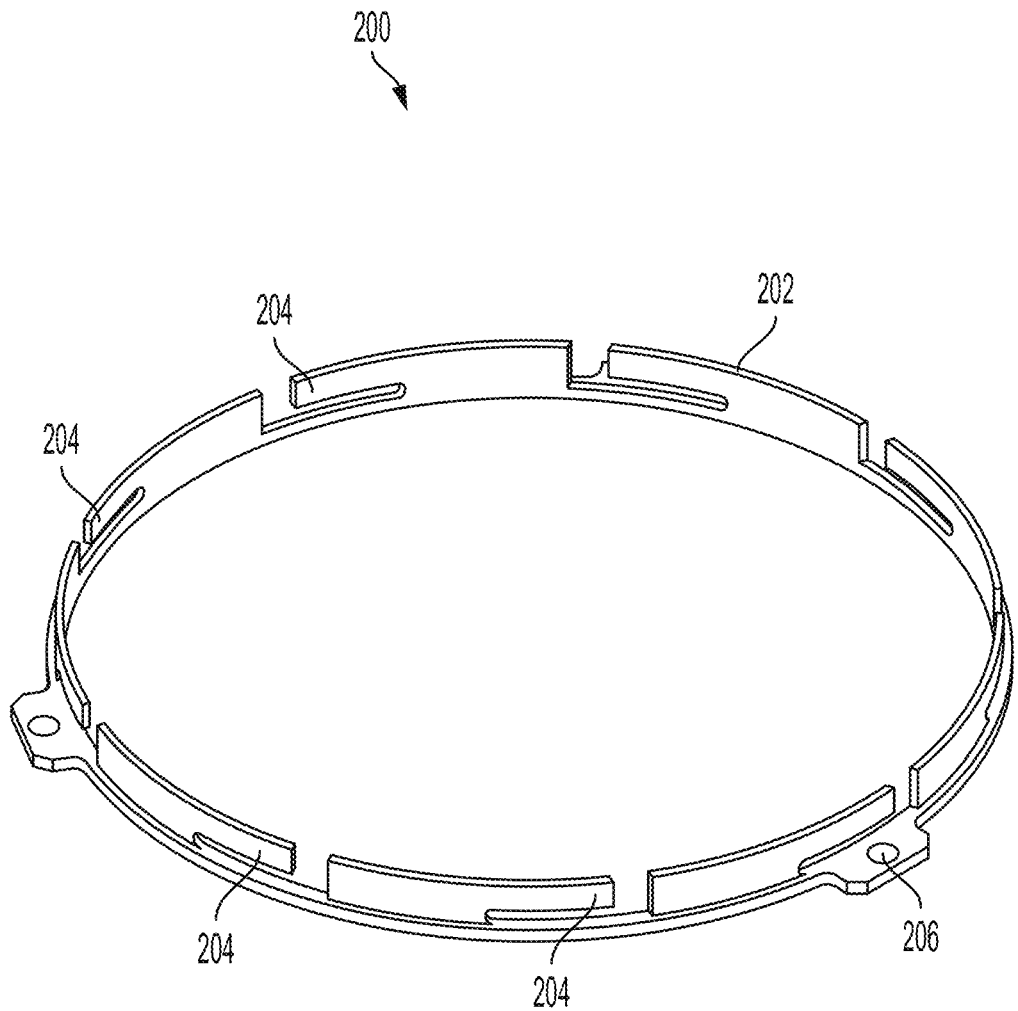
FIG. 2 depicts a large flexure made from a titanium-zirconium-niobium alloy according to embodiments of the present disclosure.

As shown in FIGS. 1C-1E, a plurality of flexures 100 are coupled to and extend away from one side of a support structure 104, which will couple to and support an opto-mechanical or opto-electronic surface, such as a mirror Although three flexures 100 are shown coupled to the support structure 104, any number of flexures 100 (one, two, three, or more) can be coupled to the support structure 104. The flexures 100 are coupled to the support structure 104 by pins (not shown) that engage and secure respective sockets 106 of the bipod strut pair 103 of each flexure 100. The support structure 104 is configured to distribute the forces applied to it evenly across each bipod strut pair 103 associated therewith. The collection of flexures 100 can be spaced as needed, which spacing may or may not be equal.

The metallurgical properties and desirable attributes of the titanium-zirconium-niobium alloy, such as compliance and fracture toughness, enable the optimization of the flexure 100 design to optimize the geometry, as well as to strike an optimum balance of stiffness and flexibility.

FIG. 3 depicts a large flexure 200 made from a titanium-zirconium-niobium alloy. The flexure 200 can be sued to mount a very weak and fragile mirror. The titanium-zirconium-niobium alloys are sufficiently strong and compliant that they can be used to make large flexures intended to mount heavy mirrors. While such a large mirror mount flexure, such as that shown in FIG. 3, may lead to cracking when made from other titanium alloys, the titanium-niobium-zirconium alloys are able to withstand the shock and vibration due to its superior compliance and low modulus.

The flexure 200 has a body 202 that is continuous and generally circular or oblong (also referred to as a circular body) and includes a plurality of attachment arms 206, which are used to couple to and secure an optical element, such as a mirror (not shown). The flexure 200 includes a plurality of notches 204 in the body 202. In some embodiments of the present disclosure, the flexure 200 has a body that is circular and has a diameter of about 5 to about 8 inches.

The flexure 100 and flexure 200 are only examples of flexures that can be manufactured from the alloys described herein. Other non-limiting examples of flexures that can be manufactured from the alloy include those used in gimbals and blade flexure concepts. According to one or more embodiments of the present disclosure, the flexural articles incorporating the alloys include a rolled sheet metal, extruded tubing, or other prefabricated subcomponents. As such, post-processing steps associated with large plastic deformations, hardening, and the like, that affect the phases and micro-structure of the preforms can also provide extra stabilization; however, the flexures for which the alloys can be used are not limited to these types of structures.

The flexures 100, 200 are formed from the titanium-zirconium-niobium alloy by various methods. In one non-limiting example, the flexure 100 is manufactured by combining, melting and casting the titanium, zirconium, niobium, and optionally other elements, using a variety of melting and metal working practices, including but not limited to, vacuum induction melting, vacuum arc re-melting, hot forging, isothermal forging, rolling into billet shapes or slabs and, eventually, forming bar or sheet/plate products. The resulting alloy materials have excellent forgeability, which enables fabrication of complex flexure configuration (see FIGS. 7 and 8 for example, which are is described in further detail below and show a macro etched cross section of a forged bar that exhibits very uniform fine-grained microstructure with excellent structural integrity).

In addition to flexures, the titanium-zirconium-niobium alloys can be sued to form antenna structures. The super elasticity properties of the alloys allow for manufacturing antenna wires that retain their shape regardless of ambient temperatures, even down to cryogenic temperatures.

Figure 3A:
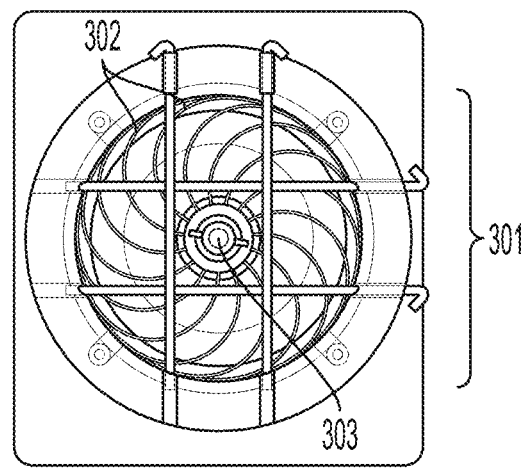
FIG. 3A depicts an antenna (stowed condition) made from a titanium-zirconium-niobium alloy according to embodiments of the present disclosure.
Figure 3B:
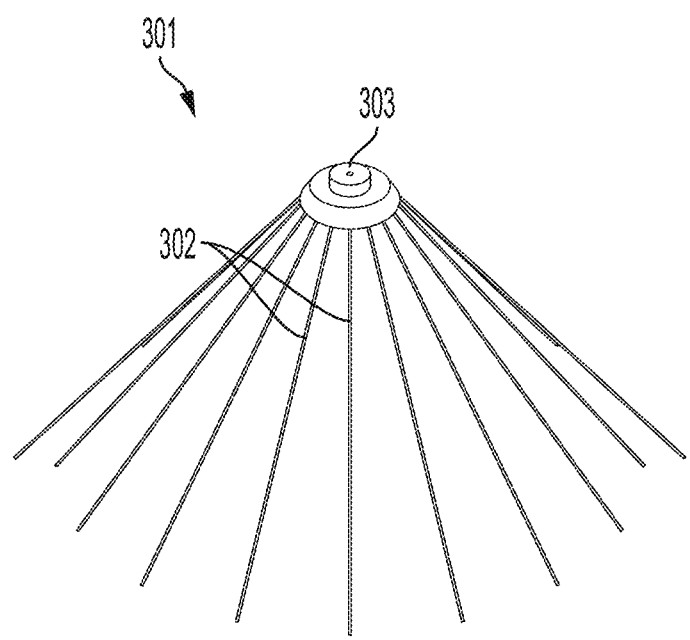
FIG. 3B depicts an antenna (deployed condition) made from a titanium-zirconium-niobium alloy according to embodiments of the present disclosure.

FIG. 3A depicts an example of an antenna 301 in the stowed condition, and FIG. 3B depicts an antenna 301 in the deployed condition. The antenna 301 includes a plurality of antenna ribs 302 that converge at an interface ring 303. By optimizing the processing of the alloy wire, the compliance and ductility of the material allows it to be wound for storage in both the "stowed" condition (FIG. 3A) and "deployed" condition (FIG. 3B) for operation.

Optionally, according to embodiments of the present disclosure, the antenna 301 includes dielectric coating layers for surface waves that influence the radiation pattern of the antenna 301. The relationship between the titanium alloy substrates, dielectric properties of the coatings, and the electrical path of the outgoing electric field define radiation efficiencies of the antenna 301 and depend on the length of the surface waves.

The antenna 300 is formed from the titanium-zirconium-niobium alloy by various methods. In one non-limiting example, the antenna 300 is manufactured by combining, melting and casting the titanium, zirconium, niobium, and optionally other elements, using a variety of melting and metal working practices, including but not limited to, vacuum induction melting, vacuum arc re-melting, hot forging, isothermal forging, rolling into billet shapes or slabs and, eventually, forming bar or sheet/plate products, and drawing into wire. The resulting alloy materials have excellent forgeability, which enables fabrication of complex flexure configurations.

The antenna 301 is only an example of an antenna that can be manufactured from the alloys described herein; the antennae for which the alloys can be used are not limited to these types of structures.

The titanium-zirconium-niobium alloys have a low modulus of elasticity, which is measured according to standard tensile test method ASTM E8/E8M-13a. Strain deformation due to exerted tensile load is measured using a Class B2 rated extensometer. According to one or more embodiments of the present disclosure, the titanium-zirconium-niobium alloy has an elastic modulus (modulus of elasticity) of about 7 to about 12 Megapounds per square inch (Msi). According to other embodiments of the present disclosure, the titanium-zirconium-niobium alloys have a modulus of elasticity of about 10 to about 11.5 Msi. Yet, according to other embodiments of the present disclosure, the alloys have a modulus of elasticity of about or in any range between about 7, 8, 9, 10, 11, and 12 Msi. Still yet, in other embodiments of the present disclosure, the alloys have a modulus of elasticity of about 9.3 to about 9.7 Msi.

The low modulus values are maintained over a temperature range of about −40° C. to about +125° C. in some embodiments of the present disclosure. In some embodiments of the present disclosure, the low modulus and super elasticity is maintained at temperatures less than −40° C., or as low as −80° C. In other embodiments of the present disclosure, the modulus values are maintained over a temperature range of about or in any range between about −40, −30, −20, −10, 0, 10, 20, 30, 40, 50, 60, 70, 80, 90, 100, 110, 120, and +125° C.

Aging the alloy following solution processing treatment at various temperatures further lowers the elastic modulus of the alloys and increases the yield strength without causing any undesirable side effects, such as omega phase formation or embrittlement. These properties are favorable for many applications, in particular, antenna applications. While many materials used for antenna applications are transformation dependent, which means that the austenite start and finish ($A_s$ and $A_f$) temperatures must be controlled to achieve the super elasticity in the desired operating range, the titanium-zirconium-niobium alloys described herein exhibit consistent super elastic behavior that is transformation and temperature independent. Accordingly, antenna wires, and other compliant flexural structures, can be stored and used at any temperature, without concern for how the transformation behavior will affect the performance of the antenna or structure.

The titanium-zirconium-niobium alloys also have high tensile strength and ductility, in combination with the low elastic modulus. Low temperature aging over time further enhances the strength and lowers the modulus of elasticity. The alloys have high strength, while maintaining super elasticity (low tensile modulus and compliance). Ultimate strength is measured according to procedures outlined in ASTM E8/E8M-13a and is the maximum stress the alloy can withstand. According to one or more embodiments of the present disclosure, the ultimate strength of the alloy is about 102 to about 150 Kilopounds per square inch (Ksi). According to other embodiments of the present disclosure, the ultimate strength of the alloy is about 115 to about 120 Ksi. Still yet, according to other embodiments of the present disclosure, the ultimate strength of the alloy is about 110 to about 140 Ksi In other aspects of the present disclosure, the ultimate strength of the alloy is about or in any range between about 102, 104, 106, 108, 110, 112, 114, 116, 118, 120, 122, 124, 126, 128, 130, 132, 134, 136, 138, 140, 142, 144, 146, 148, and 150 Ksi. Yield strength is measured according to procedures outlines in ASTM E8/E8M-13a and is the stress that will cause a permanent deformation of 0.2% of the original dimension of the alloy. According to one or more embodiments of the present disclosure, the yield strength of the alloy is about 60 to about 120 Ksi. According to other embodiments of the present disclosure, the yield strength of the alloy is about or in any range between about 80, 85, 90, 95, 100, 105, 110, 115, and 120 Ksi.

The titanium-zirconium-niobium alloys also have an expanded elongation at break, which is up to 30% according to one or more embodiments of the present disclosure. The high elongation break demonstrates the high ductility of the alloys. The elongation at break, also referred to as strain-to-failure, is measured in accordance with ASTM E8/E8M-13a, paragraph 7.11.3.3. The elongation break is determined by measuring a scribed distance of 1.0 inch within the gauge area prior to and after testing. The measurement is reported as an engineering strain, albeit high elongation at failure. The elongation break measures a ratio between increased length and initial length after breakage of the alloy at room temperature. Like the elastic modulus, aging over time enhances the ductility, as measured by the elongation break, which is highly desirable. According to some embodiments of the present disclosure, the elongation at break of the alloy is about 8 to about 30%. In other embodiments of the present disclosure, the elongation at break of the alloy is about or in any range between about 8, 9, 10, 11, 12, 13, 14, 15, 16, 17, 18, 19, 20, 21, 22, 23, 24, 25, 26, 27, 28, 29, and 30%.

The titanium-zirconium-niobium alloys also demonstrate non-linear stress-strain behavior, which is described by the Ramberg-Osgood equation. The stress-strain curve is generated in accordance with the procedures outlined in ASTM E8/E8M-13a by using an extensometer. The Ramberg-Osgood equation approximates the non-linear behavior of materials in which the stress-strain curves cannot be represented by a linear function. The Ramberg-Osgood general equation is $\sigma = \kappa \varepsilon^n$, where $\sigma$ is the true stress of the alloy, $\varepsilon$ is the true strain of the alloy, $\kappa$ is a material constant of the alloy, and n is the strain hardening index of the alloy. The degree of non-linearity in the stress-strain behavior is quantified by the parameter n.

The non-linearity in stress-strain behavior makes the alloys suitable for a variety of compliant structures, such as flexures and antenna structures, but is not limited to these structures. In addition to the small magnitude physical non-linearity of stress-strain behavior, flexible structural members used in different precise flexures, flexural parts of micro-positioners, optical mounts, and antennae exhibit large deformations and/or large strains. The strain-displacement relations in these flexures become non-linear, which is primarily due to the large operational displacements. Such geometric non-linearity therefore is primarily associated with the mechanical systems, for example, including thin-walled shells, plates, and bars that undergo large deformations or deflections. In these types of structures, large deformations can result in non-linear strain and curvature displacement relationships. Thus, the precise flexures, flexural parts of micro-positioners, optical mounts, and antennae fabricated from titanium-zirconium-niobium alloys demonstrate the general type of non-linearity, as well as geometric non-linearity with non-linear displacement-strain structural behavior and stress-strain material non-linearity. The described alloys are non-linear materials from the very beginning of the loading process, which is an essential type of mechanical behavior fully applicable to design of the micro-optic and opto-electronic assemblies.

The titanium-zirconium-niobium alloys also have a low coefficient of thermal expansion, which when coupled with low modulus and high ductility, makes these materials suitable for biomedical applications, flexures, and other antenna applications cited herein. The coefficient of thermal expansion describes the fractional change in size per degree change in temperature at a constant pressure. The coefficient of thermal expansion is measured by testing two specimens. Each specimen is bonded with a uniaxial strain gauge along the longitudinal axis. The same type of strain gauge is also bonded to a reference near-zero expansion material, such as titanium silicate glass. The specimens and the reference material are put into a thermal cycling chamber and subjected to two thermal cycles between −65° C. and +128° C. A personal computer-based data acquisition system is used to monitor and record strain and temperature from the specimens and reference. The coefficient of thermal expansion is determined from the slope of the resulting strain versus temperature chart.

EXAMPLES

Titanium-zirconium-niobium alloy compositions were prepared, evaluated, and used to fabricate compliant mounts and mechanism structures in accordance with embodiments of the present disclosure, as detailed in the Examples below.

Example 1

Figure 4:
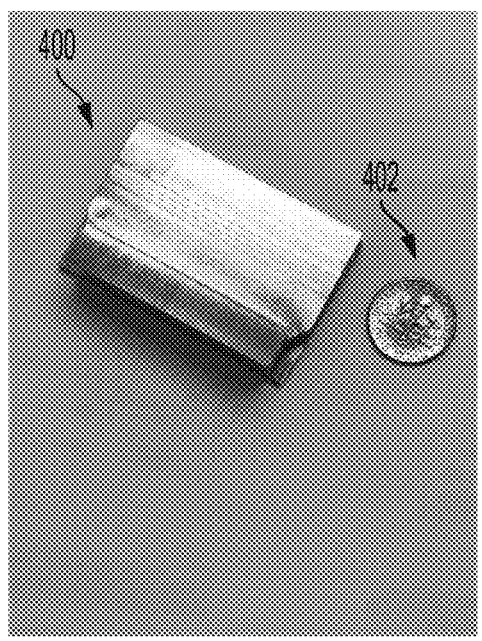
FIG. 4 depicts an example of a flexure made from a titanium-zirconium-niobium alloy according to embodiments of the present disclosure.

A bipod flexure was fabricated from a titanium-zirconium-niobium alloy by vacuum induction melting and hot forging. FIG. 4 shows the bipod flexure 400 in progress, after rough machining from the alloy. In FIG. 4, the bipod flexure 400 is shown adjacent to a dime 402 for size comparison purposes. Table 1 shows the alloy composition of the bipod flexure 400.

TABLE 1

Alloy composition of bipod flexure

| Element | Amount (wt. %) Top - Bottom | Minimum (wt. %) | Maximum (wt. %) |
| --- | --- | --- | --- |
| Nb | 18.87 | 18.00 | 19.00 |
| Zr | 13.83 | 13.50 | 14.50 |
| O | 0.07 | — | 0.13 |
| Fe | <0.01 | — | 0.10 |
| C | 0.01 | — | 0.08 |
| N | 0.01 | — | 0.03 |
| H | 0.0029 | — | 0.0125 |
| Ti | Balance | | |

Example 2

An antenna wire was fabricated from a titanium-zirconium-niobium alloy by annealing a forged bar through multiple reductions and anneal cycles, followed by drawing to a 0.024-inch diameter from a 0.0535 diameter without any annealing. A final anneal was performed at 1400° F. (760° C.) for 2 hours. Table 2 shows the modulus of the antenna wire, with an average of 11.38 Msi for a 0.0235 inches in diameter wire. Table 3 shows the max load, ultimate strength and percent elongation for a 0.235-inch in diameter wire. The average ultimate strength was 139,230 Psi, and the average percent elongation was 13.05%.

TABLE 2

Modulus of antenna wire

| Test Type | Support Span (inches) | Material | Average Diameter (inches) | Modulus (Msi) |
| --- | --- | --- | --- | --- |
| 3-Point Flexure | 0.48 | Titanium alloy wire, annealed and solution treated | 0.0235 | 11.24 |
| 3-Point Flexure | 0.48 | Titanium alloy wire, annealed and solution treated | 0.0235 | 11.52 |
| | | | Average | 11.38 |

TABLE 3

Strength and percent elongation of antenna wire

| Test Type | Material | Average Diameter (inches) | Max Load (pounds) | Ultimate Strength (Psi) | Percent Elongation (%) |
| --- | --- | --- | --- | --- | --- |
| Tension | Titanium wire, annealed and solution treated | 0.0235 | 60.39 | 139,230 | 12.7 |
| Tension | Titanium wire, annealed and solution treated | 0.0235 | 60.33 | 139,100 | 13.4 |
| | | | Average | 139,165 | 13.05 |

Example 3

Figure 5:
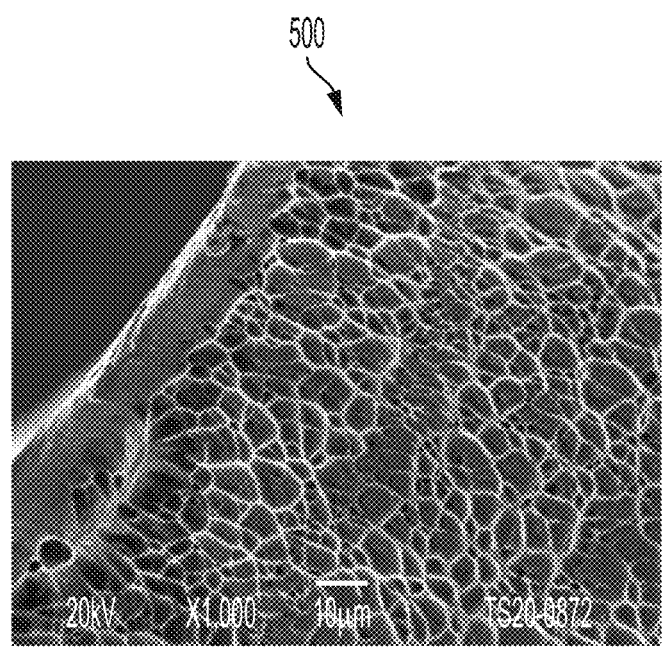
FIG. 5 depicts a photomicrograph a titanium-zirconium-niobium alloy according to embodiments of the present disclosure.

FIG. 5 depicts an electron micrograph (1000× magnification) of a titanium-zirconium-niobium alloy material 500, showing the excellent ductile fracture of the alloy.

Figure 6:
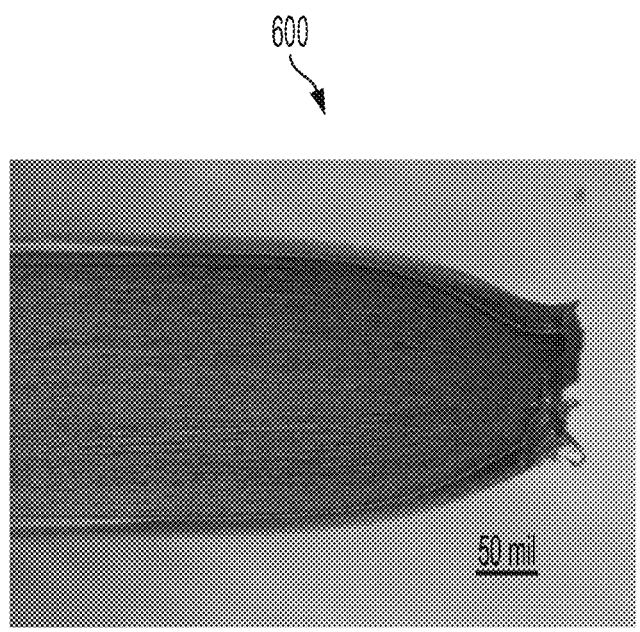
FIG. 6 depicts a photomicrograph of a forged titanium-zirconium-niobium alloy according to embodiments of the present disclosure.

FIG. 6 depicts a photomicrograph (10× magnification) of a forged titanium-zirconium-niobium alloy 600, which further confirms the excellent ductility and fracture toughness by the classic "cup & cone" ductile fracture exhibited by the tensile specimen. Because this property is exhibited by the material in the forged condition, this demonstrates that the excellent ductility was unaffected by aging. The forging was done manually in a mechanical press first by breaking down a 4.5 inches diameter by 4 inches height solid cylindrical ingot. First breakdown of the cast structure was done between 1600 degrees Fahrenheit (° F.) and 1300° F.; when the ingot was first upset, the height reduced from 4 inches to 3 inches. Then, further upsetting was done by axially elongating the cylindrical surface into an approximately 3 inches square section. The resultant rectangular bar was reheated to 1400° F. and additionally forged between approximately 1400 and 1150° F. As can be noted from these data, the forgeability of the alloy was excellent, far surpassing most standard titanium alloys and resulting in a structurally sound forging. Even with forging with considerable work strengthening, the resulting structure still possessed the ductility illustrated in FIG. 6. Such behavior was directly attributed to the congruently melting nature of the alloy and the formation of solid solutions during the subsequent treatments.

Figure 7:
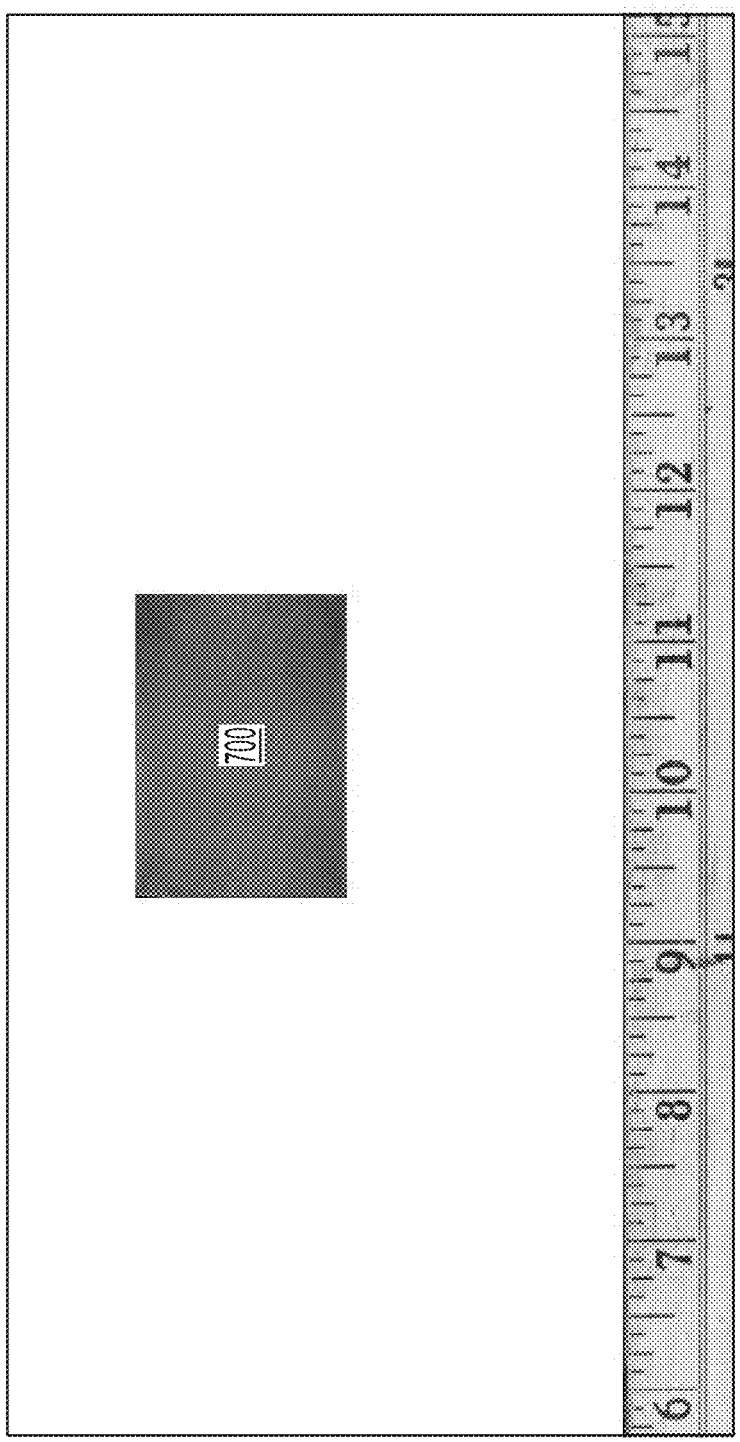
FIG. 7 depicts a macro etched cross section of the forged bar used to manufacture a bipod flexure.

FIG. 7 depicts a photomacrograph of a forged bar used to manufacture a bipod flexure. This type of evaluation was performed to inspect for any forging defects, inhomogeneity, or segregation anomalies in the structure or oxidation or alpha layer. The Figure illustrates a structure which is defect free and very homogeneous, composed of equiaxed grains and exhibiting freedom from any inclusions or oxidation/contamination layer.

Figure 8:
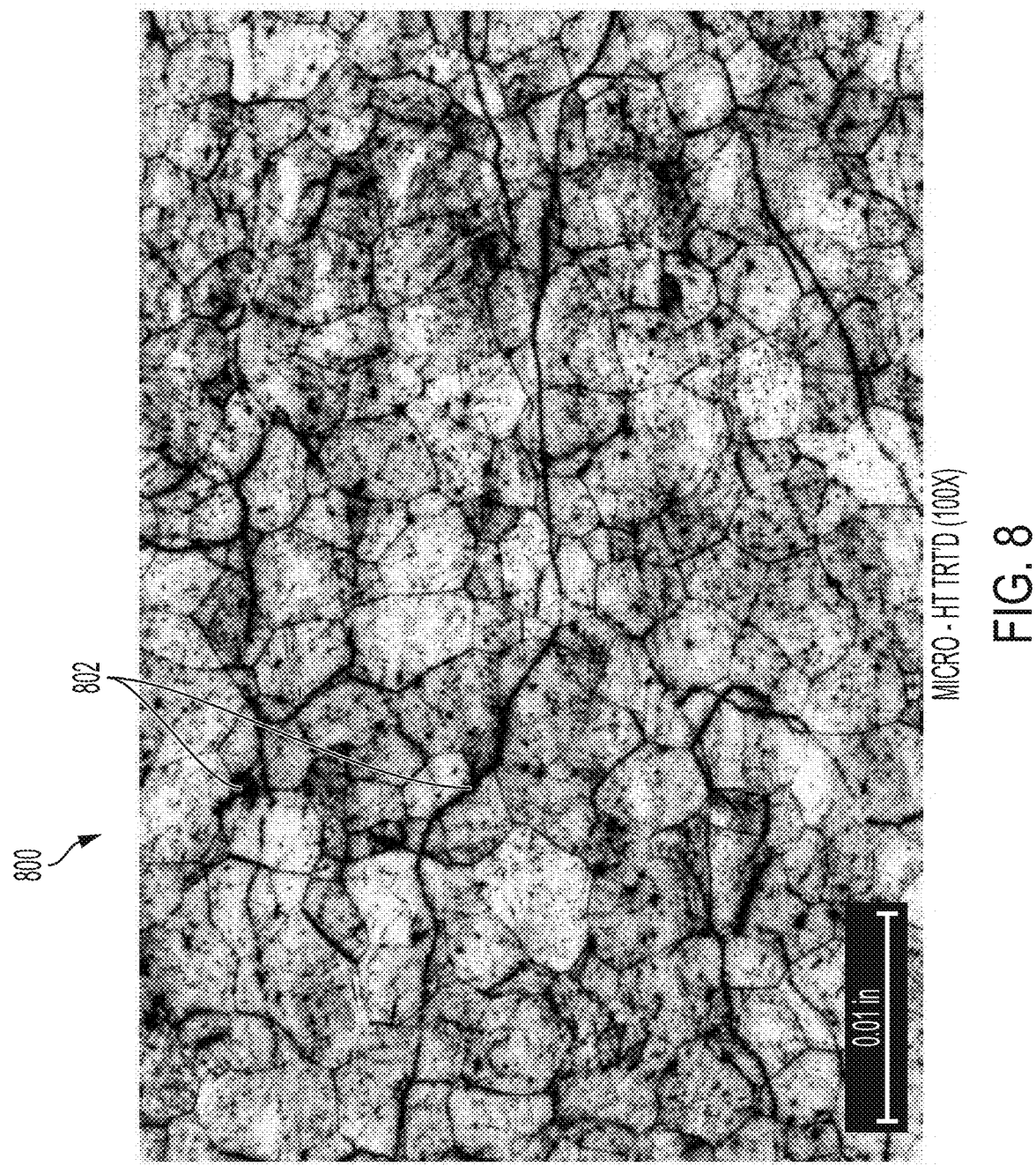
FIG. 8 depicts a photomicrograph of a heat-treated titanium-zirconium-niobium alloy according to embodiments of the present disclosure.

FIG. 8 depicts a photomicrograph (100× magnification) of the heat-treated a composite titanium-zirconium-niobium alloy 800. The composite alloy was etched with Kroll's reagent, which includes 1 to 3% hydrofluoric acid and 2 to 6% nitric acid in 100 milliliters of water. The darker etching contrast, for example as shown in area 802, is due to the pure alloy readily reacting with the chemical etchant. As shown, the alloy 800 had a uniform equiaxed grain structure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, in some embodiments, "about" can include a range of ±10%, 9%, 8%, 7%, 6%, 5%, 4%, 3%, 2%, or 1% of a given value.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A flexure comprising:
a bipod strut pair extending from a base;
wherein the flexure includes a titanium-zirconium-niobium alloy comprising titanium, about 13.5 to about 14.5 wt. % zirconium, and about 18 to about 19 weight % (wt. %) niobium, the titanium-zirconium-niobium alloy having a congruent melting temperature of about 1750 to about 1800° Celsius (° C.).

2. The flexure of claim 1, wherein the flexure is coupled to a support structure, and the support structure is further coupled to one or more flexures.

3. The flexure of claim 2, wherein the support base is coupled to a mirror.

4. The flexure of claim 1, wherein the titanium-zirconium-niobium alloy has an elastic modulus of about 7 to about 12 Megapounds per square inch (Msi).

5. The flexure of claim 1, wherein the titanium-zirconium-niobium alloy has an elongation at break of about 8% to about 30%.

6. The flexure of claim 1, wherein the titanium-zirconium-niobium alloy has an ultimate strength of about 115 to about 120 Kilopounds per square inch (Ksi), and an elastic modulus of about 9.6 to about 9.7 Msi.

7. A flexure comprising:
a circular body; and
a plurality of attachment arms arranged on the circular body to couple the flexure to an optical element;
wherein the flexure includes a titanium-zirconium-niobium alloy comprising titanium, about 13.5 to about 14.5 wt. % zirconium, and about 18 to about 19 weight % (wt. %) niobium, the titanium-zirconium-niobium alloy having a congruent melting temperature of about 1750 to about 1800° C.

8. The flexure of claim 7, wherein the circular body of the flexure has a diameter of about 5 to about 8 inches.

9. The flexure of claim 7, wherein the optical element is a mirror.

10. The flexure of claim 7, wherein the titanium-zirconium-niobium alloy has an elastic modulus of about 7 to about 12 Megapounds per square inch (Msi).

11. The flexure of claim 7, wherein the titanium-zirconium-niobium alloy has an elongation at break of about 8% to about 30%.

12. The flexure of claim 7, wherein the titanium-zirconium-niobium alloy has an ultimate strength of about 115 to about 120 Kilopounds per square inch (Ksi).

* * * * *